Patented Feb. 28, 1933

1,899,878

UNITED STATES PATENT OFFICE

WILHELM MOSER, OF RIEHEN, NEAR BASEL, SWITZERLAND, ASSIGNOR TO THE FIRM OF SOCIETY OF CHEMICAL INDUSTRY IN BASLE, OF BASEL, SWITZERLAND

DYESTUFFS OF THE DIBENZANTHRONE SERIES AND PROCESS OF MAKING SAME

No Drawing. Application filed October 3, 1931, Serial No. 566,812, and in Switzerland October 14, 1930.

The present invention relates to the manufacture of new dyestuffs of the dibenzanthrone series containing chlorine and bromine and dyeing tints which are fast to water. It comprises the process of making these dyestuffs, as well as the dyestuffs themselves.

In United States Patent No. 1,771,802 dyestuffs are disclosed which dye navy blue shades fast to water. These dyestuffs are produced by chlorinating dibenzanthrone between 100° and 160° C. in presence of nitrobenzene.

These dyestuffs contain at least about 3 atoms of chlorine. The positions where these chlorine atoms are fixed in the dibenzanthrone molecule

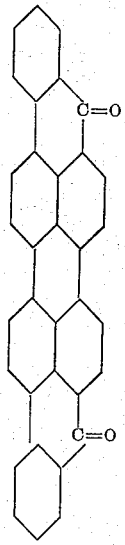

are not known.

According to the present invention the products obtained by the said manufacture can be converted into further dyestuffs which dye green blue tints fast to water by treating them with bromine or an agent yielding bromine in sulfuric acid, or an analogue thereof, such as chlorosulfonic acid or fuming sulfuric acid. The bromination best occurs in presence of a carrier, such as iodine or sulfur. According to the proportion of bromine used and to the temperature, one can obtain products which dye blue of a more or less greenish hue. The higher the temperature and the greater the proportion of bromine, the more green blue and the richer in bromine is the dyestuff. The analyses of the products show that they contain about 4 to 5 halogen atoms, of which at least 3 are chlorine atoms and at least 1 is bromine.

The new products are dark powders, dissolve in sulfonic acid to blue-violet solutions, in caustic alkaline hydrosulfite solutions to greenish blue solutions, and dye cotton from the vat the stated tints.

The following examples illustrate the invention, the parts being by weight unless otherwise stated.

Example 1

20 parts of the chlorinated dibenzanthrone, which can be obtained as described in Example 1 of U. S. Patent No. 1,771,802, are dissolved in 200 parts of chlorosulfonic acid at ordinary temperature. There are added to the solution, while stirring, 0.5 part of iodine, or the corresponding quantity of sulfur, and 12 parts of bromine. While still stirring, the whole is heated to 55° C. and is kept at 55–60° C. until all the bromine has been consumed. The mass is then poured upon ice and the dyestuff isolated as usual. There is obtained a blue violet powder which dyes cotton in a greenish blue vat clear green blue tints. The dyeing is excellently fast and, above all, completely fast to water. The dyestuff dissolves in strong sulfuric acid to a blue violet solution, which is considerably more blue than that of the parent material. From this solution water precipitates green blue flocks. In solvents of high boiling point, such as nitrobenzene, the dyestuff dissolves to a red violet solution having a slightly red fluorescence. The analysis shows that a trichlormonobromedibenzanthrone is present.

Instead of a chlorosulfonic acid, other suitable solvents may be used, such as fuming sulfuric acid.

If in the bromination more bromine is used, for example 24 parts and preferably at a raised temperature, there is obtained a product the halogen content of which corresponds to that of a trichlordibrome-dibenzanthrone, and possessing the above mentioned dyeing properties.

Example 2

1 kilo of the dyestuff made as described in Example 1 is made into a paste with 100 grams of Turkey red oil and mixed with 100 litres of water at 60° C.; 5 litres of caustic soda solution of 36° Bé. are added and there are strewn into the liquor 2.5 kilos of hydrosulfite conc. powder. The vatting is complete after 10 minutes.

A dye-vat is prepared from 1000 litres of water containing so much caustic soda that the dye-bath contains 16 cc. of caustic soda solution of 36° Bé. per litre (including the caustic soda solution of the stock vat); after heating to 60° C. any lime compounds are skimmed off and the vat is sharpened according to the depth of tint required by addition of hydrosulfite conc. powder. In general, there is used for bright tints, 1 kilo, for medium tints 0.5 kilo and for dark tints 0.2 kilo of hydrosulfite conc. powder per 1000 litres of dye-vat. The stock vat is now mixed with the dye-vat and the well boiled and wetted cotton is entered, dyeing being continued for ¾ hour to 1 hour at 60° C. The dyed goods are rinsed in water containing a little hydrosulfite, soured, again rinsed and developed at the boil by treatment with 3 grams of soap and 1 gram of calcined sodium carbonate per litre of water for ½ hour.

What I claim is:—

1. A process for the manufacture of new dyestuffs of the dibenzanthrone series containing chlorine and bromine and dyeing tints fast to water, consisting in brominating the dyestuffs dyeing navy blue tints fast to water, which are produced by chlorinating violanthrone between 100° and 160° C. with chlorine gas in presence of nitrobenzene, in chlorosulfonic acid.

2. A process for the manufacture of new dyestuffs of the dibenzanthrone series containing chlorine and bromine and dyeing tints fast to water, consisting in brominating the dyestuffs dyeing navy blue tints fast to water, which are produced by chlorinating violanthrone between 100° and 160° C. with chlorine gas in presence of nitrobenzene, in chlorosulfonic acid in presence of a carrier.

3. A process for the manufacture of new dyestuffs of the dibenzanthrone series containing chlorine and bromine and dyeing tints fast to water, consisting in brominating the dyestuffs dyeing navy blue tints fast to water, which are produced by chlorinating violanthrone between 100° and 160° C. with chlorine gas in presence of nitrobenzene, in chlorosulfonic acid in presence of iodine.

4. As new products the chlorine and bromine containing at least tetrahalogenated dibenzanthrones dyeing cotton blue to greenish blue tints fast to water, which dibenzanthrones contain at least 3 atoms of chlorine and at least one atom of bromine, the said products being dark powders, and dissolving in sulfuric acid to blue-violet solutions.

In witness whereof I have hereunto signed my name this 25th day of September 1931.

WILHELM MOSER.